H. F. TROH.
SLEIGH BRAKE AND STOP.
APPLICATION FILED JULY 7, 1909.

965,419.

Patented July 26, 1910.

3 SHEETS—SHEET 1.

Witnesses
F. L. Ourand
R. R. Duffie

Inventor
Henry F. Troh
By John S. Duffie.
Attorney

H. F. TROH.
SLEIGH BRAKE AND STOP.
APPLICATION FILED JULY 7, 1909.

965,419.

Patented July 26, 1910.

3 SHEETS—SHEET 2.

Witnesses
F. L. Ourand
R. R. Duffie

Inventor
Henry F. Troh

By John S. Duffie.
Attorney

H. F. TROH.
SLEIGH BRAKE AND STOP.
APPLICATION FILED JULY 7, 1909.
965,419.
Patented July 26, 1910.
3 SHEETS—SHEET 3.
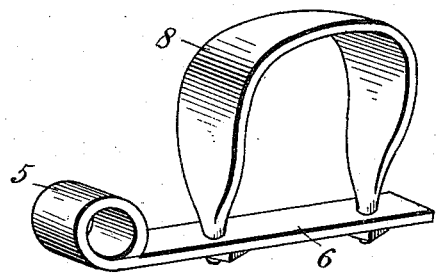
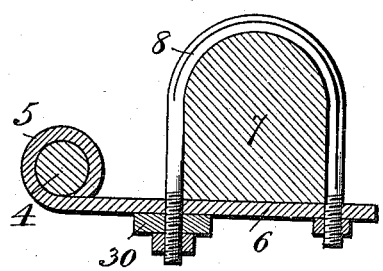
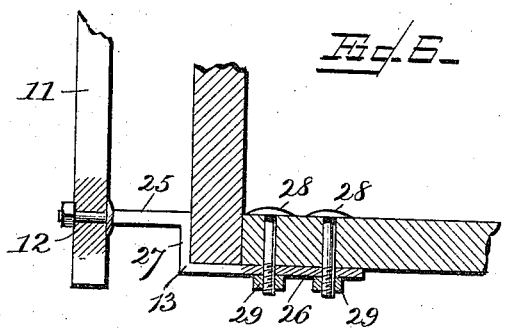
Witnesses
F. L. Ourand
R. R. Duffie
Inventor
Henry F. Troh
By John S. Duffie
Attorney

UNITED STATES PATENT OFFICE.

HENRY FR. TROH, OF GLENWOOD, WASHINGTON.

SLEIGH BRAKE AND STOP.

965,419.  Specification of Letters Patent.  Patented July 26, 1910.

Application filed July 7, 1909. Serial No. 506,286.

*To all whom it may concern:*

Be it known that I, HENRY F. TROH, a citizen of the United States, residing at Glenwood, in the county of Klickitat and State of Washington, have invented certain new and useful Improvements in Sleigh Brakes and Stops, of which the following is a specification.

This invention relates to a sleigh brake and stop and has for its object to provide a sleigh brake which may be used to prevent the sleigh from crowding the horse or team when descending a hill or steep decline and which may also be used to assist in bringing the horse or horses to a standstill, when desired.

A further object of the invention is to provide a sleigh brake which may be used as a stop to hold the load of the sleigh when the sleigh is stopped while ascending a steep hill, thus entirely relieving the horses or draft animals of the strain.

With these and other objects in view, the invention consists of certain novel features of construction, combination and arrangement of parts, as will be more fully described and particularly pointed out in the appended claim.

Figure 1:
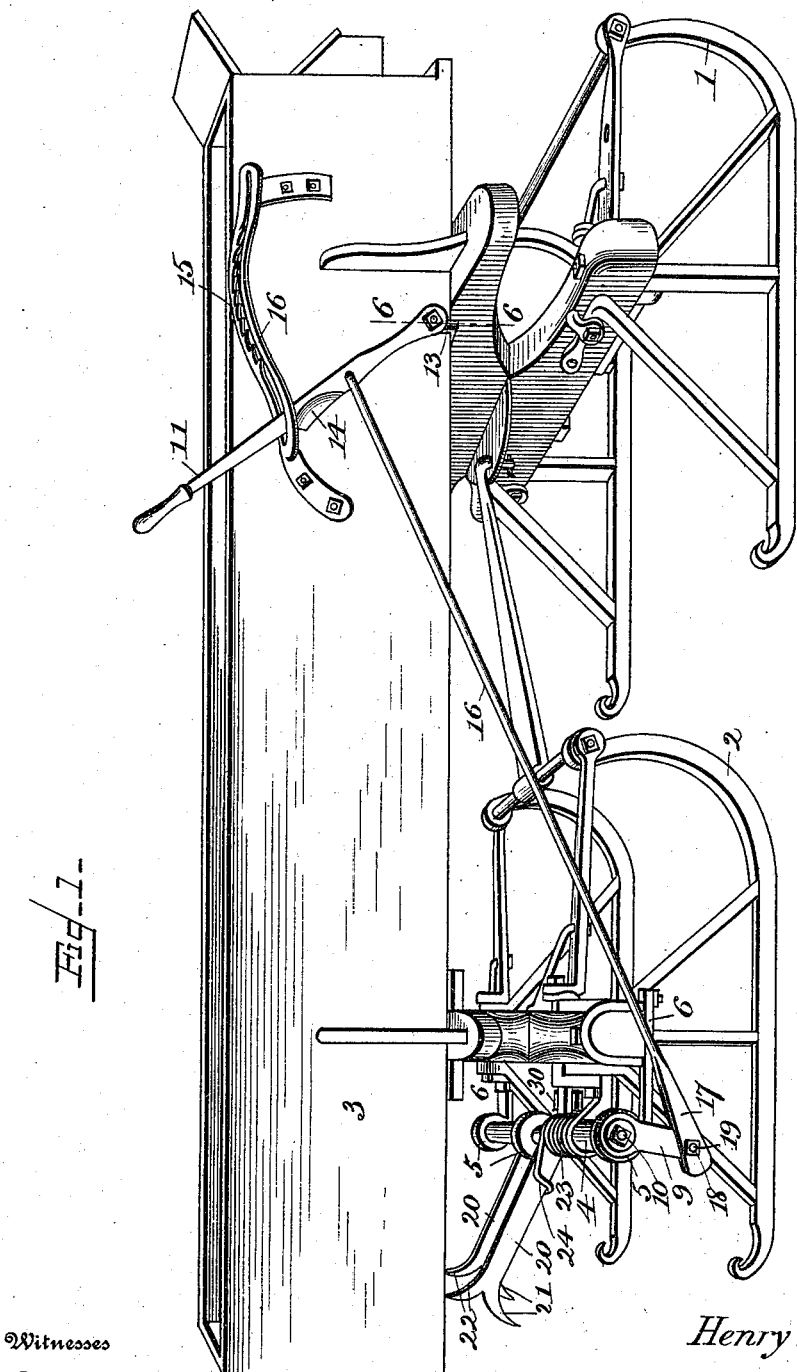
Figure 2:
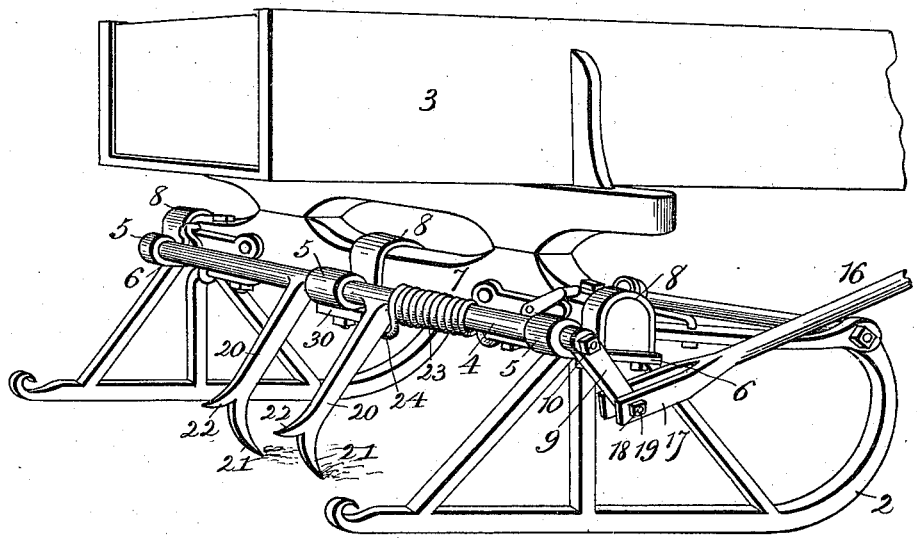
Figure 3:
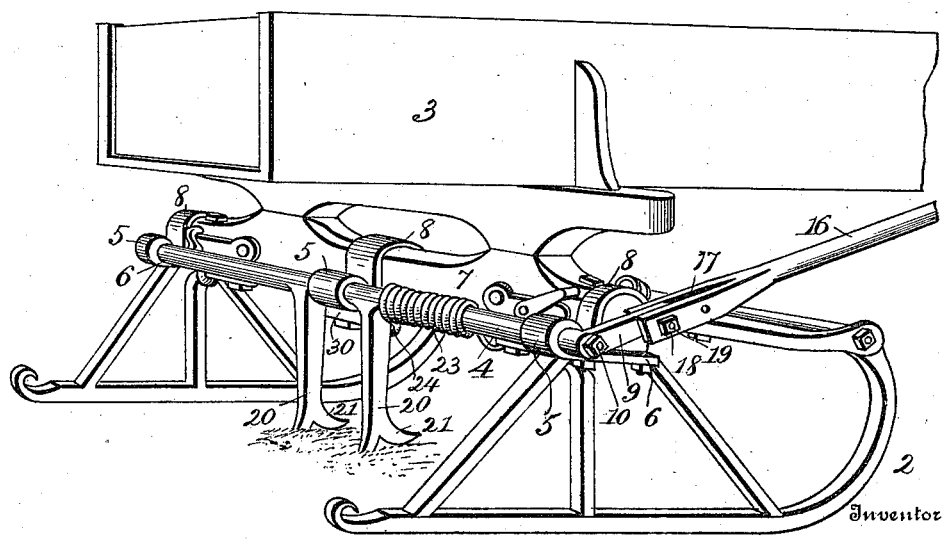

In the accompanying drawings, Figure 1 is a perspective view illustrating the application of the brake to a sleigh of ordinary construction, the brake beams or bars being shown in elevated position; Fig. 2 is a similar view of the rear portion of the sleigh showing the position of the parts when the device is used as a brake while descending hills or declines or when used to assist in bringing the sleigh and horses to a standstill; Fig. 3 is a similar view showing the position of the parts when the device is used as a stop to hold the load when the sleigh is stopped while ascending a hill or incline; Fig. 4 is a detail view of one of the end clips and bearing plates for the rock shaft; Fig. 5 is a vertical transverse section taken through the central or intermediate clip; and Fig. 6 is a vertical transverse section taken on line 6—6 of Fig. 1.

In the accompanying drawings which are not drawn to scale, 1 indicates the forward pair of runners, 2 the rear pair of runners and 3, the body of a sleigh of any ordinary or improved construction. The brake comprises a horizontal transverse rock shaft, 4, which is mounted in bearings in the nature of loops or eyes, 5, formed by suitably bending the rear terminals of supporting plates, 6, secured to the ends and center of the beam, 7, by the clips, 8. This rock shaft is provided at one end with a crank arm, 9, which is secured to a squared extension of the rock shaft by a nut, 10. A vertically disposed operating lever, 11, is pivotally mounted at its lower end upon the cylindrical extension, 12, of a flat bearing plate, 13. The operating lever, 11, is provided with a beveled portion, 14, which is adapted to engage the teeth, 15, of the rack, 16, bolted or otherwise secured to one side of the wagon body or bed.

The operating lever is connected with the free end of the crank arm, 9, by a connecting rod, 16, provided at its rear end with a pair of longitudinal laterally spaced arms, 17, which receive said end of the crank arm and which are connected therewith by a bolt and nut, 18 and 19, respectively. The rock shaft, 4, is provided with a pair of centrally disposed laterally spaced brake beams or arms, 20, which extend rearwardly and are provided at their free ends with forwardly and rearwardly extending spurs, 21 and 22, respectively. The brake beams, 20, are normally held in elevated or inoperative position by a coil spring, 23, which is disposed around the rock shaft, 4, with its end, 24, extending under one of the brake beams. The bearing plate, 13, is provided with an outer right-angularly formed portion, 25, and is arranged in position with the vertical piece, 27, of its outer portion, 25, fitting against the outer face of the adjacent side piece of the wagon body and with its portion, 26, fitting under the body. This plate is secured in position by fastening bolts, 28, which extend through the bottom of the wagon body and nuts, 29, which screw upon said bolts.

When it is desired to use the device as a brake when descending a hill or decline or to bring the horses and sleigh to a standstill, the operating lever, 11, is moved forwardly to turn the rock shaft, 4, to a sufficient extent against the action of the spring, 23, to lower the brake beams, 20, into the position shown in Fig. 2.

When it is desired to use the device as a stop to sustain the load in ascending a steep hill or incline the operating lever is moved farther forward to bring the brake beams into the position shown in Fig. 3, said lever being held in this position by engaging its beveled portion, 14, with the rack teeth, 15. When the brake beams are in position shown in Fig. 3, the inner edges thereof abut against a stop plate, 30, secured to the central or intermediate bearing plate, 6, by one leg of the adjacent clip, 8.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having thus described my invention, what I claim is:—

A sleigh brake of the class described, comprising a plurality of supporting plates having their rear terminals bent to form eyes or loops, clips for attaching said plates to the beam of rear pair of runners, a horizontal rock shaft mounted in the eyes or loops of said supporting plates and provided with a pair of centrally disposed laterally spaced brake beams formed at their outer or free ends with forwardly and rearwardly extending spurs, speaking in relation to the brake arms when in operative position, a coil spring around the rock shaft to normally hold the brake beams in elevated or inoperative position, manually operated means for actuating the rock shaft against the tension or action of said spring to swing the brake beams into position to enable either the forward or rear spurs to engage the surface over which the vehicle is passing, and a stop plate carried by the central or intermediate clip and forming a stop adapted to be engaged by the brake beams to limit the forward swinging movement thereof.

In testimony whereof I affix my signature, in presence of two witnesses.

HENRY FR. TROH.

Witnesses:
Wm. T. Darch,
W. B. Presby.